United States Patent [19]

Hamada

[11] Patent Number: 5,370,416
[45] Date of Patent: Dec. 6, 1994

[54] AIRBAG SYSTEM FOR AUTOMOTIVE VEHICLE INCLUDING AIRBAG MOUNTING STRUCTURE WITH HIGH DEGREE OF AIRTIGHTNESS

[75] Inventor: Sinji Hamada, Ayase, Japan

[73] Assignee: Ikeda Bussan Co., Ltd., Ayase, Japan

[21] Appl. No.: 26,761

[22] Filed: Mar. 5, 1993

[30] Foreign Application Priority Data

Mar. 17, 1992 [JP] Japan ................... 4-091781

[51] Int. Cl.⁵ .............................................. B60R 21/20
[52] U.S. Cl. .................................................... 280/728 A
[58] Field of Search ........... 280/728 R, 728 A, 728 B, 280/730 R, 732, 743 R

[56] References Cited

U.S. PATENT DOCUMENTS

| | | | |
|---|---|---|---|
| 3,768,824 | 10/1973 | Kloppe et al. | 280/731 |
| 4,136,894 | 1/1979 | Ono et al. | 280/729 |
| 4,400,010 | 8/1983 | Stütz et al. | 280/732 |
| 4,915,410 | 4/1990 | Bachelder | 280/732 |
| 5,011,181 | 4/1991 | Laucht et al. | 280/731 |
| 5,069,480 | 12/1991 | Good | 280/743 R |
| 5,131,677 | 7/1992 | Horiuchi et al. | 280/731 |
| 5,184,843 | 2/1993 | Berger et al. | 280/728 |
| 5,217,254 | 6/1993 | Satoh | 280/728 A |

FOREIGN PATENT DOCUMENTS

| | | |
|---|---|---|
| 0405908 | 1/1991 | European Pat. Off. . |
| 0520537 | 12/1992 | European Pat. Off. . |
| 2109463 | 5/1972 | Germany . |
| 2150744 | 5/1973 | Germany ................ 280/740 |
| 2804718 | 8/1978 | Germany . |
| 3939311 | 5/1990 | Germany . |
| 9014749.9 | 3/1991 | Germany . |
| 56-43890(B2) | 10/1981 | Japan . |
| 61-185642[U] | 11/1986 | Japan . |
| 2-38860[U] | 3/1990 | Japan . |
| 2246984 | 2/1992 | United Kingdom . |
| 2247214 | 2/1992 | United Kingdom . |
| WO91/18766 | 12/1991 | WIPO . |
| WO92/00206 | 1/1992 | WIPO ........................... 280/728 A |

Primary Examiner—Karin L. Tyson
Attorney, Agent, or Firm—Foley & Lardner

[57] ABSTRACT

An airbag safety system for an automotive vehicle includes a housing having disposed therein a gas generator and a retainer which has a lower mounting flat surface for attaching an inflatable airbag tightly to the housing. The housing includes upper and lower members, the upper member being attached to the lower member and having a gas passage allowing gas to flow from the gas generator into the airbag, the lower member having an opening oriented towards the airbag. The upper member further includes an upper mounting flat surface which is formed on a peripheral portion of the gas passage and is contoured to the lower mounting flat surface of the retainer. With this arrangement, the entire circumferential edge portion of the airbag is interposed between the upper mounting flat surface of the upper member and the lower mounting flat surface of the retainer without any clearance for establishing an airtight seal between the airbag and the housing.

6 Claims, 4 Drawing Sheets

AIRBAG SYSTEM FOR AUTOMOTIVE VEHICLE INCLUDING AIRBAG MOUNTING STRUCTURE WITH HIGH DEGREE OF AIRTIGHTNESS

BACKGROUND OF THE INVENTION

1. Field of The Invention

The present invention relates generally to an airbag safety system for an automotive vehicle. More particularly, the invention is directed to an airbag mounting structure for assuring that an airbag remains highly airtight when being inflated.

2. Description of The Prior Art

It is current practice to incorporate an airbag safety system into automotive vehicles to protect a vehicle's occupant from impact in the event of an accidental collision.

Japanese Utility Model First Publications Nos. 61-185642 and 2-38860 and Japanese Patent Second Publication No. 56-43890 disclose a conventional airbag safety system.

An example of such a conventional airbag safety system will be described with reference to FIG. 4. The shown airbag safety system 1 is supported, in an instrument panel 2, by a portion 3 of a steering wheel through a supporting member 4 and includes a housing 6 which disposes therein a gas generator 5. An airbag 7 is fixedly secured to the housing and is enclosed by an airbag cover 8 while the airbag is folded tightly. In operation, when impact due to an accidental vehicle collision occurs, the gas generator 5 ejects gas into the airbag 7 to inflate it for restraining a vehicle's occupant against a seat in safety from serious impact.

The above prior art airbag safety system, however, encounters a drawback in that clearances occur undesirably at a mounting portion of the airbag 7 on the housing 6 for the following reasons. The airbag 7 is simply installed on the housing 6 with a peripheral edge portion of the airbag being secured to a circumferential distal side wall of the housing 6 by retainers (not shown) which are screwed into the housing by screws. With this mounting arrangement, clearance may develop between corners of the side wall of the housing and the retainers with the result that gas discharged by the gas generator 5 may leak outside the airbag through the clearances, thereby reducing a degree of inflation of the airbag 7.

SUMMARY OF THE INVENTION

It is, therefore, a principal object of the present invention to avoid the disadvantages of the prior art.

It is another object of the present invention to provide an airbag safety system for an automotive vehicle which assures airtightness of an airbag when being inflated.

According to one aspect of the present invention, there is provided an airbag safety apparatus for an automotive vehicle which comprises an inflatable airbag, a gas generator which is operable to generate gas for inflating the airbag, a housing which disposes therein the gas generator, and a retainer for attaching the airbag to the housing. The housing includes upper and lower members, the lower member having an opening oriented towards the airbag, the upper member being attached to the lower member so as to enclose the opening of the lower member and having a gas passage for allowing gas flow from the gas generator into the airbag, the upper member further including a mounting surface which is formed on a peripheral portion of the gas passage. The retainer includes a mounting surface which is contoured to the mounting surface of the upper member, the retainer being fixedly attached to the upper member such that a peripheral edge portion of the airbag is interposed hermetically between the mounting surfaces of the upper member and the retainer.

In the preferred mode, the mounting surface of the upper member may engage the mounting surface of the retainer in a plane without any clearance. Additionally, the mounting surface of the upper member may be formed on an upper flat surface of the upper member while the mounting surface of the retainer may be formed on a lower flat surface of the retainer. Further, the airbag may be attached to the housing with the entire peripheral surface thereof being sandwiched tightly between the mounting surfaces of the upper member and the retainer by a fastening means.

BRIEF DESCRIPTION OF THE DRAWINGS

The present invention will be understood from the detailed description given hereinbelow and from the accompanying drawings of the preferred embodiments which are given for explanation and understanding only and are not intended to imply limitation to the invention.

In the drawings.

DESCRIPTION OF THE PREFERRED EMBODIMENT

Figure 1:
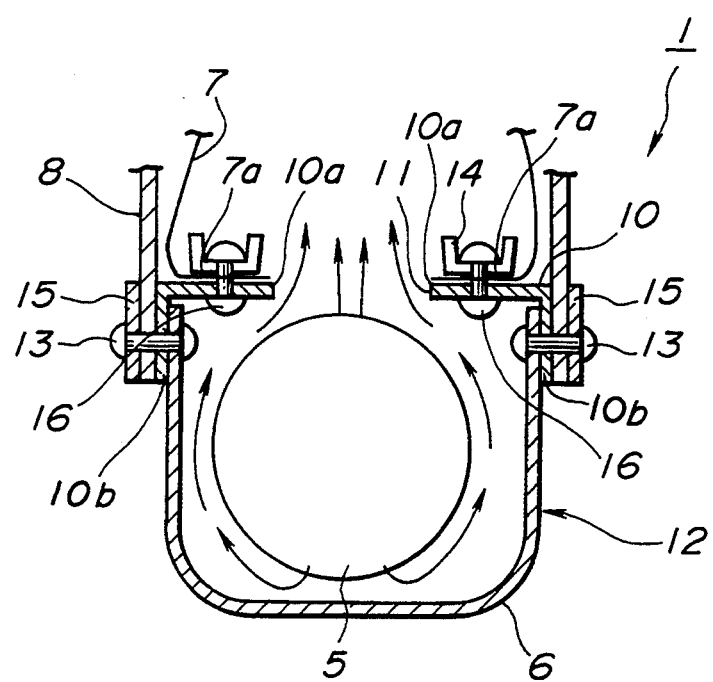
FIG. 1 is a sectional view which shows an airbag safety system according to the present invention.
Figure 2:
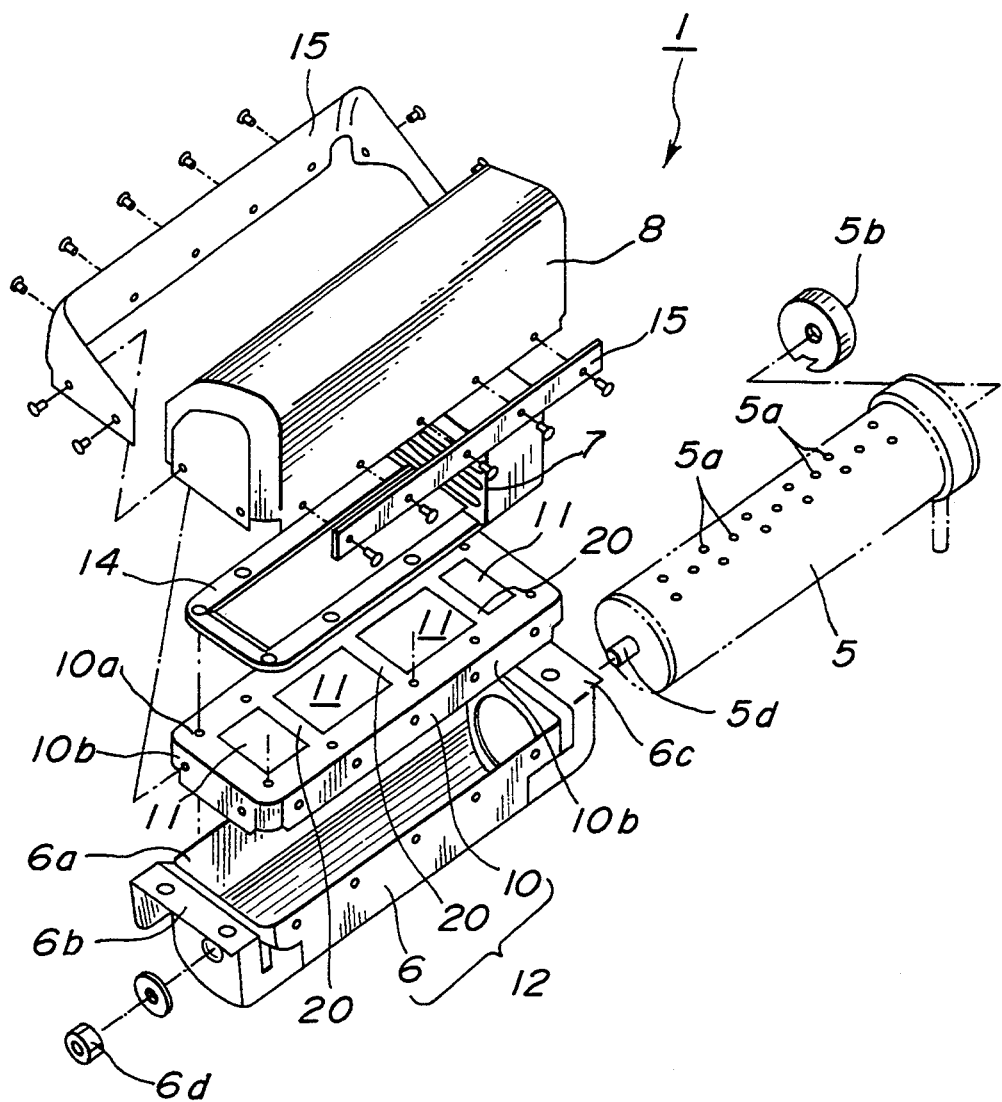
FIG. 2 is an exploded perspective view which shows an airbag safety system.
Figure 3:
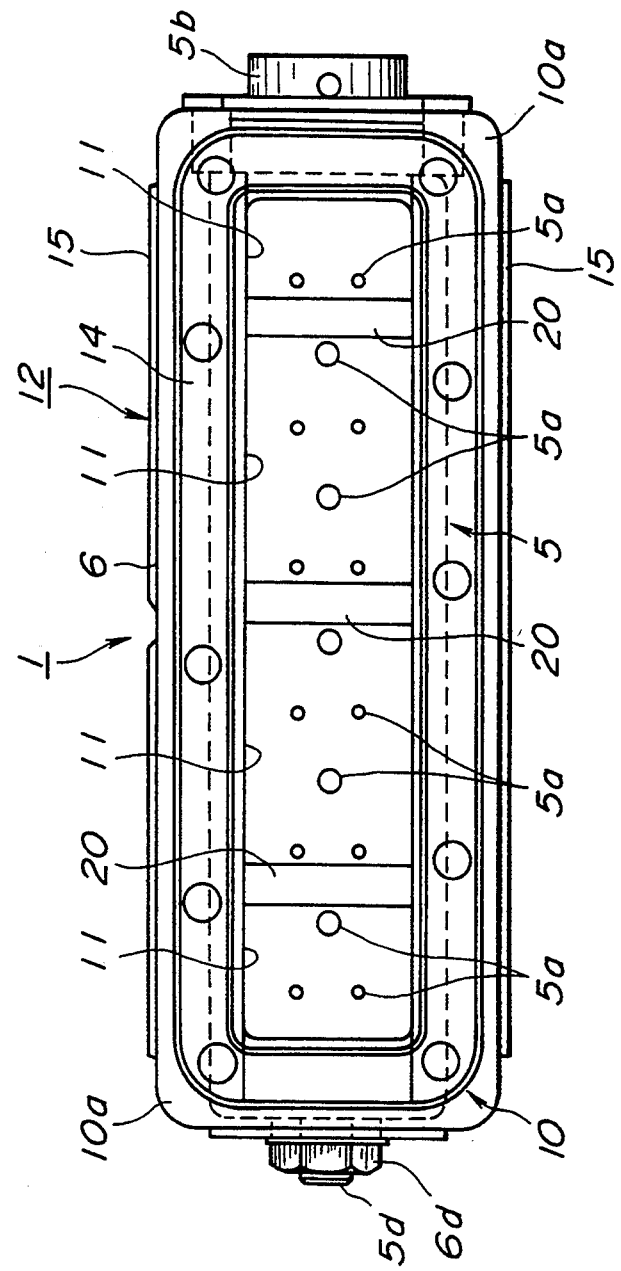
FIG. 3 is a top plan view which shows a positional relation between an airbag mounting frame and outlet ports of a gas generator.
Figure 4:
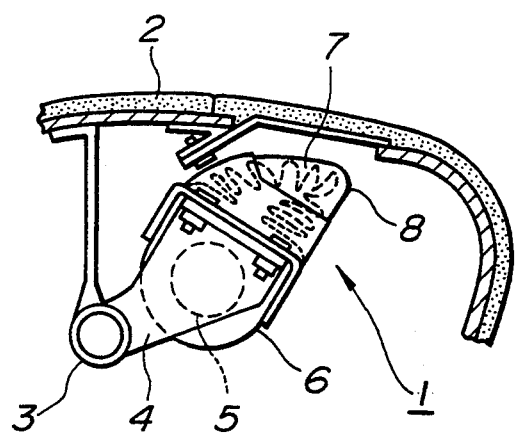
FIG. 4 is a sectional view which shows an essential part of a prior art airbag safety system.

Referring now to the drawings, particularly to FIGS. 1 and 2, there is shown an airbag safety unit 1 according to the present invention which may be utilized in an automotive vehicle. The airbag safety unit 1 includes generally a housing 12, an inflatable airbag 7, an airbag cover 8, a gas generator 5, and supporting members 15. The housing 12 includes a lower base member 6 of substantially U-shaped cross section defining a gas generator chamber and an upper base member 10 of substantially C-shaped cross section. The lower base member 6 has an upper aperture 6a, as shown in FIG. 2, for defining a gas flow passage into the airbag 7 and flanges 6b and 6c which retain the airbag safety unit 1 to a stationary member of a vehicle body. The upper base member 10 is attached to the, lower base member 6 for covering the upper aperture 6a. A plurality of gas discharge openings 11, substantially square shaped, are formed in a longitudinally central portion of the upper base member 10 to define a frame structure which includes an outer frame portion 10a made of a rectangular member and three inner frame portions 20 made of strip members. The airbag cover 8 is installed on an upper surface of the upper base member 10 to receive therein the airbag 7 being folded in the illustrated manner. The gas generator 5 is disposed within the housing 12 and fixed to an end wall of the lower base member 6 by means of a bolt 5d, a nut 6d, and an end cap 5b in a fashion as shown in FIG. 3. The gas generator 5 is operable to discharge gas into the airbag 7 through the gas discharge openings 11 defined within the upper aperture 6a upon occurrence of serious impact due to an accidental vehicle collision.

The outer frame portion 10a has a substantially flat upper surface which is contoured to an lower surface of a retainer 14 so that the retainer 14 may engage the upper base member 10 in a plane without any clearance therebetween by means of rivets 16 with an opening edge portion of the airbag 7 being sandwiched tightly between the upper surface of the outer frame portion 10a and the lower surface of the retainer 14.

The inner frame portions 20, as shown in FIG. 2, extend perpendicularly to the longitudinal center line of the upper base member 10 to integrally connect between side sections of the outer frame portion 10a for providing a preselected degree of rigidity to the frame structure (i.e., the upper base member 10) which is sufficient for resisting a large-scale impact due to quick gas discharging from the gas generator 5. It will be appreciated that the inner frame portions 20 function as a reinforcement member.

It is preferable that the inner frame portions 20 are, as shown in FIG. 3, arranged between gas outlets 5a of the gas generator 5 so that the gas discharge openings 11 coincide with the gas outlets 5a respectively to prevent the inner frame portions from interfering with gas flow from the gas generator 5 for securing quick inflation of the airbag 7.

In assembling, the entire circumferential opening edge portion 7a of the airbag 7 is sandwiched between the upper base member 10 and the retainer 14 which is, in turn, fastened by means of the rivets 16 without any clearance therebetween. The airbag cover 8 is then put on the airbag 7 and is temporarily attached to the upper base member 10 by the supporting members 15. Afterwards, this assembly is fixedly mounted on the lower base member 6 such that a circumferential side wall 10b of the upper base member 10 is fixedly connected to an opening edge of the lower base member 6 by means screws 13.

With the above arrangement, the opening edge portion 7a of the airbag 7 is hermetically interposed between the upper flat surface of the outer frame portion 10a of the upper base member 10 and the lower flat surface of the retainer 14, establishing an air-tight seal therebetween. Therefore, gas is prevented from leaking out of the airbag safety unit 1 to secure inflation of the airbag 7 required for protecting a vehicle's passenger from serious impact due to a vehicle collision.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An airbag safety apparatus for an automotive vehicle comprising:
   an inflatable airbag;
   a gas generator which is operable to generate gas for inflating said airbag;
   a housing having disposed therein said gas generator, said housing being provided with upper and lower members, said lower member having an opening oriented towards said airbag, said upper member being attached to said lower member so as to enclose the opening of said lower member and having a gas passage allowing gas to flow from said gas generator into said airbag, said upper member further including a mounting surface which is formed on a peripheral portion of said gas passage; and
   a retainer including a mounting surface which is contoured to said mounting surface of said upper member, said retainer being fixedly attached to said upper member such that a peripheral edge portion of said airbag is interposed between said mounting surfaces of said upper member and said retainer;
   wherein said airbag and said gas generator are located respectively on opposite sides of said mounting surface of said upper member of said housing;
   wherein said upper member is located outside said lower member; and
   wherein said upper member includes a circumferential sidewall which is fixedly connected to an exterior edge portion of said lower member.

2. An airbag safety apparatus as set forth in claim 1, wherein the mounting surface of the upper member engages the mounting surface of the retainer in a plane.

3. An airbag safety apparatus as set forth in claim 2, wherein the mounting surface of the upper member is formed on an upper surface of the upper member, the mounting surface of the retainer being formed on a lower surface of the retainer.

4. An airbag safety apparatus as set forth in claim 3, wherein said airbag is attached to said housing with an entire peripheral surface thereof being sandwiched tightly between the mounting surfaces of said upper member and said retainer by fasteners.

5. An airbag safety system as set forth in claim 2, wherein said mounting surfaces of the upper member of said housing and said retainer are substantially flat surfaces respectively.

6. An airbag safety apparatus as claimed in claim 1, wherein said airbag and said gas generator are located respectively on opposite sides of said mounting surface of said upper member of said housing, even when said airbag is in a deflated state.

* * * * *